O. C. TUTTLE.
ARTIFICIAL MINNOW BAIT.
APPLICATION FILED MAY 3, 1917.

1,273,425.                                    Patented July 23, 1918.

Orley C. Tuttle, Inventor
By his Attorney
James Hamilton

UNITED STATES PATENT OFFICE.

ORLEY C. TUTTLE, OF OLD FORGE, NEW YORK.

ARTIFICIAL-MINNOW BAIT.

1,273,425.              Specification of Letters Patent.    Patented July 23, 1918.

Application filed May 3, 1917. Serial No. 166,072.

*To all whom it may concern:*

Be it known that I, ORLEY C. TUTTLE, a citizen of the United States of America, residing at Old Forge, in the county of Herkimer and State of New York, have invented certain new and useful Improvements in Artificial-Minnow Baits, of which the following is a specification, reference being had to the accompanying drawing.

This invention relates to improvements in artificial fishing baits or lures and particularly to improvements in artificial fishing baits in which the bait is given the form of a small fish, such as a minnow, and is mounted revolubly; and an object of this invention is to provide an artificial fishing bait or lure, of the character just referred to, which will prove simple in construction, comparatively inexpensive in manufacture, and efficient and durable in operation and use, and which will, when drawn through the water (as in trolling or casting), imitate in movement, appearance and action a live minnow chased by a pursuing fish seeking the minnow as its prey.

Figure 1:
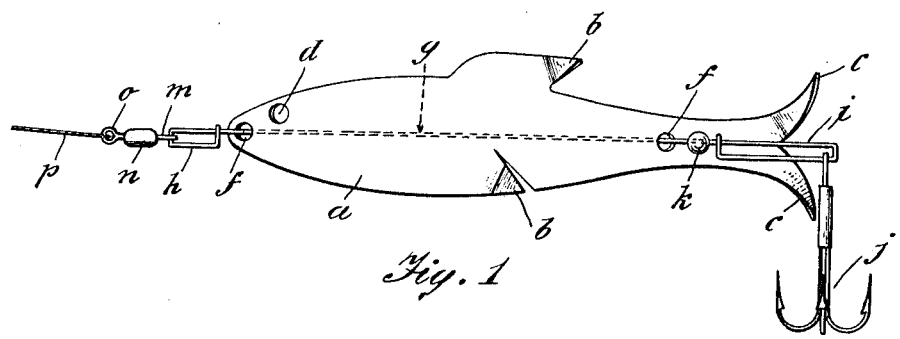
Figure 2:
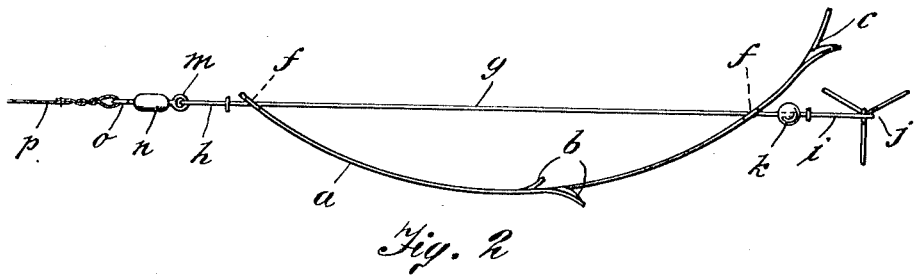

In the drawings illustrating the principle of this invention and the best mode now known to me of applying that principle, Figure 1 is a side elevation, and Fig. 2 is a plan, of the bait or lure.

The imitation or artificial minnow $a$ (Figs. 1 and 2) is made from thin plate material cut in the form of a live minnow and is formed with fins $b$ and a tail $c$ and with a hole $d$ that simulates the eye of the minnow $a$, when the latter is drawn rapidly through the water. In each of the ends of the minnow $a$, there is formed a hole $f$; and there is passed, through these holes $f$, a shaft $g$ of stiff wire-like material, each end of which is formed with a loop $h$, $i$. The rear loop $i$ supports a group of fish-hooks $j$; and, between the rear loop $i$ and the rear hole $f$, there is mounted, on the shaft $g$, a stop $k$ that limits the rearward movement of the minnow $a$ along the shaft $g$. With the front loop $h$, there is engaged one eye $m$ of the swivel $n$ to the other eye $o$ of which there is fastened one end of the fishline $p$.

The minnow $a$ is, as is best shown in Fig. 2, arcuate or bow-shaped; and the shaft $g$ lies on the concave side of the curved minnow $a$. Due to the curved or arcuate shape of the minnow $a$, it is caused to turn upon the shaft $g$, when drawn through the water; and, by giving the minnow $a$ the proper curvature, its rate of rotation on the shaft $g$ can be adjusted so that the minnow $a$ will turn just fast enough to make the same attractive to the fish sought to be caught.

In order to give the artificial minnow $a$ the bright, glistening appearance of a live minnow, it is made of metal having a shining surface, such as may be obtained by polishing or plating (as nickel-plating) the metal or as is inherent in the metal itself (*e. g.*, aluminum).

I am aware that spoon-shaped and minnow-shaped lures have been patented heretofore; for example, a spoon-shaped bait is disclosed by the Evans Patent, No. 1089915, granted March 10, 1914, and minnow-shaped baits are shown and described in the Heckeler Patent, No. 784398, granted March 7, 1905, and the Kausch Patent, No. 813500, issued February 27, 1906. As is stated at lines 14 and 15, page 1, of Evans' specification, his spoon and hook are forced to revolve or spin in unison, while my minnow $a$ is free to revolve upon the shaft $g$ carrying the hooks $j$. In Heckeler's patented bait, the rotation of the artificial minnow A is dependent upon the fins with which it is formed, as is stated at lines 52—54 and lines 67—70, page 1, of the specification of the Heckeler patent. In the Kausch lure, the hook is attached to a medial rib with which the artificial minnow is formed, as is set forth at lines 65—67, page 1, of Kausch's specification, and the minnow and hook whirl around together; there is provided no shaft upon which the minnow rotates, as there is in the lure hereinbefore described. In my artificial bait, the rotation of the minnow is dependent upon the arcuate or bow shape thereof and takes place upon a shaft that does not participate in the rotary movement of the minnow and that carries the hooks.

I claim:

A fish-lure including an artificial minnow made of thin plate bent into arcuate form and provided at its ends with holes; and a shaft which passes through said holes and with respect to which the minnow is unsymmetrically disposed, whereby the minnow is caused to revolve on the shaft freely when drawn through the water; the shaft being adapted to be attached at one end to a fishline and at its opposite end to the fishhooks and the minnow being given a minnow shape and made bright to attract the fish while whirling.

Signed at Rome in the county of Oneida and State of New York, this 26th day of April, A. D. 1917, in the presence of the two undersigned witnesses.

ORLEY C. TUTTLE.

Witnesses:
H. D. HURLBUT,
J. W. BARKER.